(12) United States Patent
Fushie et al.

(10) Patent No.: US 11,296,624 B2
(45) Date of Patent: Apr. 5, 2022

(54) ELECTRONIC CONTROL DEVICE

(71) Applicant: Mitsubishi Electric Corporation, Tokyo (JP)

(72) Inventors: Shunsuke Fushie, Tokyo (JP); Yu Kawano, Tokyo (JP); Rei Araki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 801 days.

(21) Appl. No.: 16/072,372

(22) PCT Filed: May 25, 2016

(86) PCT No.: PCT/JP2016/065444
§ 371 (c)(1),
(2) Date: Jul. 24, 2018

(87) PCT Pub. No.: WO2017/203625
PCT Pub. Date: Nov. 30, 2017

(65) Prior Publication Data
US 2021/0211075 A1 Jul. 8, 2021

(51) Int. Cl.
*H02P 27/06* (2006.01)
*H02P 5/74* (2006.01)
(Continued)

(52) U.S. Cl.
CPC ............... *H02P 5/74* (2013.01); *H02M 1/44* (2013.01); *H02M 7/48* (2013.01); *B60R 16/033* (2013.01); *B62D 5/04* (2013.01)

(58) Field of Classification Search
CPC ........ H02M 1/123; H02M 1/008; H02M 7/48; H02M 1/44; H02M 1/0003; B60R 16/03;
(Continued)

(56) References Cited

U.S. PATENT DOCUMENTS 5,651,352 A 7/1997 Terakado et al.
5,842,457 A 12/1998 Terakado et al.
(Continued)

FOREIGN PATENT DOCUMENTS

JP 2000-340740 A 12/2000
JP 3574112 B2 10/2004
JP 2005-218256 A 8/2005

OTHER PUBLICATIONS

International Search Report for PCT/JP2016/065444 dated Aug. 9, 2016.

*Primary Examiner* — Jared Fureman
*Assistant Examiner* — Esayas G Yeshaw
(74) *Attorney, Agent, or Firm* — Sughrue Mion, PLLC; Richard C. Turner

(57) ABSTRACT

An electronic control device of the invention having a multiple of power supply system lines, with an object of providing a device such that no circulation path is formed in a ground line, includes a power supply in which a multiple of power supply system lines are provided, a multiple of drive units to which the power is independently supplied from the power supply system lines, and at least one controller that outputs control signals to the multiple of drive units, and is configured so that negative side lines of the power supply system lines are connected by one ground line in the controller.

18 Claims, 4 Drawing Sheets

(51) Int. Cl.
  *H02M 1/44* (2007.01)
  *H02M 7/48* (2007.01)
  *B60R 16/033* (2006.01)
  *B62D 5/04* (2006.01)

(58) Field of Classification Search
  CPC . B60R 16/033; H02J 7/00; B62D 5/04; H02P 5/74
  See application file for complete search history.

(56) References Cited

U.S. PATENT DOCUMENTS

| | | | |
|---|---|---|---|
| 6,137,705 A | 10/2000 | Maekawa et al. | |
| 2014/0312969 A1* | 10/2014 | Hamond | H03F 3/2176 330/251 |
| 2015/0256116 A1* | 9/2015 | Tateda | B60L 3/04 318/504 |
| 2017/0324332 A1* | 11/2017 | Molari | H02M 3/1584 |
| 2019/0379297 A1* | 12/2019 | Agirman | H02M 1/0061 |

* cited by examiner

ELECTRONIC CONTROL DEVICE

CROSS REFERENCE TO RELATED APPLICATIONS

This application is a National Stage of International Application No. PCT/JP2016/065444 filed May 25, 2016.

TECHNICAL FIELD

The present invention relates to an electronic control device including a multiple of power supply system lines, a multiple of drive units with a comparatively large current, and at least one controller that outputs a control signal that controls the drive units.

BACKGROUND ART

An existing electronic control device wherein at least two pairs of power supply system lines (a positive side and a negative side) are connected, a drive unit is connected to each pair, and the electronic control device includes at least one controller that outputs a control signal to the drive unit, is such that when current controlled by the drive unit is high, a potential difference occurs in ground (negative side) lines due to routing of the ground lines.

CITATION LIST

Patent Literature

Patent Document 1: Japanese Patent No. 3,574,112

SUMMARY OF INVENTION

Technical Problem

The device disclosed in Patent Document 1 is such that one pair of controllers and one pair of drive units (power switch units) are integrated, the controller has one ground line, the drive unit has one ground line, and the ground line of the drive unit is connected to an aluminum body. Also, compared with current flowing into the controller, a considerably high current flows into the drive unit, because of which, depending on routing of the ground lines, there is a possibility of a path along which current is diverted into the controller being formed.

Furthermore, a device that includes a multiple of drive units, and to which a multiple of power supply system lines are connected, is such that a large number of ground lines, equivalent to the total of the number of drive units and the number of controllers, exists. This kind of device is such that, depending on a magnitude of ground line impedance, an unneeded current path is formed. As a result of this, ground potential fluctuates, because of which there is a possibility of a deterioration in voltage detection accuracy, or the like, of a controller.

The invention, having been contrived in order to resolve the heretofore described kinds of problem, provides an electronic control device having a multiple of power supply system lines such that ground lines are redesigned.

Solution to Problem

An electronic control device of the invention includes a power supply in which a multiple of power supply system lines are provided, a multiple of drive units to which the power is independently supplied from the power supply system lines, and at least one controller that outputs control signals to the multiple of drive units, wherein the electronic control device is configured so that negative side lines of the power supply system lines are connected by one ground line in the controller.

Advantageous Effects of Invention

The electronic control device of the invention has a controller that outputs a control signal to a drive unit to which a power supply system line is connected, and a ground line of the controller is connected in one place, whereby a ground potential level of the controller can be fixed, no unneeded circulation circuit is formed between controllers, and there is no worsening of voltage signal detection accuracy in the controller.

DESCRIPTION OF EMBODIMENTS

First Embodiment

Hereafter, the invention will be described based on drawings showing a first embodiment.

Figure 1:
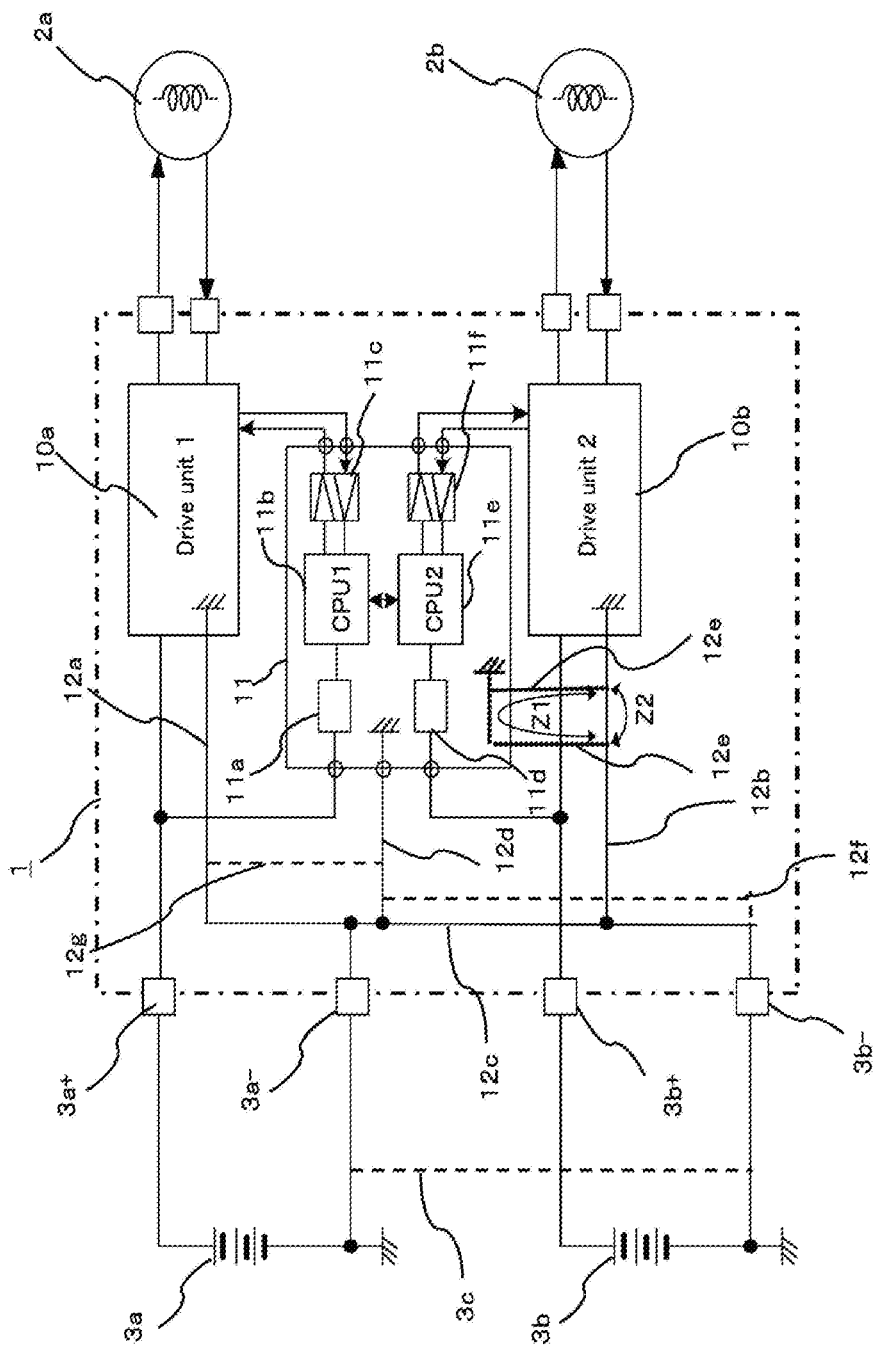
FIG. 1 is an overall circuit diagram showing an electronic control device according to a first embodiment of the invention.

FIG. 1 is a circuit diagram of a vehicle-use electronic control device showing a main configuration of the invention.

In the drawing, an electronic control device has two batteries $3a$ and $3b$ forming a power supply, and is configured so that a two-system operating power is supplied via connector terminals $3a+$, $3a-$, $3b+$, and $3b-$ of the batteries $3a$ and $3b$.

Also, the electronic control device includes a multiple of drive units $10a$ and $10b$ to which power of one each of the two power systems is independently supplied from the two batteries $3a$ and $3b$, and a controller 11 that controls by outputting control signals to the drive units $10a$ and $10b$, and is configured so as to drive actuators $2a$ and $2b$ using outputs of the drive units $10a$ and $10b$ respectively. Herein, a control unit 1 is configured excluding the batteries $3a$ and $3b$ and the actuators $2a$ and $2b$.

Also, the controller 11 has power supply circuits $11a$ and $11d$ connected to the batteries $3a$ and $3b$ respectively, a CPU (central processing unit) $11b$ and a CPU $11e$ connected to the power supply circuits $11a$ and $11d$ respectively, and input/output circuits $11c$ and $11f$ connected to the CPU $11b$ and the CPU $11e$ and sending and receiving signals to and from the drive units $10a$ and $10b$ respectively, and each of these circuits is basically formed independently in two systems.

Positive side power is supplied to the controller 11 from the batteries $3a$ and $3b$, whereby a constant voltage is applied to the CPU $11b$, the CPU $11e$, and the input/output circuits 11c and 11f via the power supply circuits 11a and 11d. Also, negative sides of the batteries 3a and 3b are connected by a body line 3c of a chassis GND (ground).

Looking next at ground lines (negative sides), ground lines (negative sides) are connected to the drive units 10a and 10b, which drive by causing a large current to flow into the actuators 2a and 2b, from the connector terminals 3a− and 3b−connected to the batteries 3a and 3b. Also, the connector terminals 3a− and 3b− are connected via a ground line 12c, and the two are set so as to have a common potential. Furthermore, the common ground line 12c is connected to a GND pattern of the controller 11 by one controller ground line 12d.

Although each circuit exists independently in an interior of the controller 11, a ground line is formed in only one place, the common controller ground line 12d.

In a case in which the ground line 12d is not common, and is connected to the inside of the controller 11 from each of the connector terminals 3a− and 3b− in the same way as the power supplies (positive sides), or in a case in which the ground line 12d is not connected at all, and two circuit systems of the controller 11 are completely independent, the CPU 11b and CPU 11e, for example, monitor voltage of each portion, and when there is even the slightest difference between ground potential levels when data on voltage information is exchanged between the CPU 11b and the CPU 11e, a difference also occurs between the monitored voltages, whereupon there is determined to be an abnormality, and controllability is affected.

Also, for example, a case in which communication is carried out between the CPU 11b and the CPU 11e with an object of alternately monitoring each other's state is such that when a difference occurs between the ground potential levels of the CPU 11b and the CPU 11e, there is concern that a difference will occur between actual communication waveform voltage levels of the CPU 11b and the CPU 11e, and in a worst case, communication cannot be carried out. To give a specific example, even when the CPU 11b transmits a 5V waveform with the ground potential of the CPU 11b as a reference, communication cannot be carried out normally when taking the ground potential of the CPU 11e as a reference results in 2.5V.

Consequently, the controller 11 having the two CPUs 11b and 11e with this kind of configuration is such that there is desirably a single ground potential level.

Also, supposing that there is no common ground line 12c, and individual ground lines 12a and 12b are connected to the controller 11 in the same way as the power supply (positive side) lines, then when looking at a current feedback route when control is started by a large current being caused to flow into the drive unit 10a in this state, the current passes along the ground line 12a of the drive unit 10a, and a greater portion thereof returns to the battery 3a via the connector terminal 3a−. However, due to an effect of impedance, one portion of the feedback current passes along the ground line of the controller 11, returning to the battery 3a via the connector terminal 3a−along an originally unenvisaged and unneeded circulation path.

In this case, current flows along the ground lines 12a and 12b of the controller 11, causing the previously described kind of difference between ground potential levels inside the controller 11 to occur.

Also, when the controller 11 is formed of a printed substrate or the like, and the flow of a large current is not envisaged, durability as a product is also affected.

Due to the heretofore described kind of circulation path, for example, the potentials of the ground lines 12a and 12b of the controller 11 fluctuate along with driving of the actuators 2a and 2b, as a result of which there is a possibility of a circuit determination mistake or an error being caused, but the problem can be resolved by connecting the common ground line 12c, connecting to the controller 11 with one ground line by connecting the ground line 12d from the common ground line 12c, and also creating a common ground in the controller 11.

Also, in addition to the connection of the controller ground line 12d, the same advantage can be achieved by connecting to the controller 11 with one ground line, as with a ground line 12f or 12g. The ground line 12f is connected directly from the one connector terminal 3b−, and the ground line 12g is connected directly from the ground line 12a of the one drive unit 10a.

Furthermore, although the configuration here is such that connection to the controller 11 is carried out with the one ground line 12d, this includes connecting with a multiple of neighboring ground lines, rather than a literal one. With regard to this multiple of neighboring ground lines, as shown in FIG. 1, two lines 12e extending from the ground line 12b are such that, when impedance of ground lines passing through the controller 11 is defined as Z1 and impedance on the ground line 12b as Z2, the ground line configuration needs to be such that Z2<<Z1 in order that drive current does not flow into the lines 12e and cause the ground potential level of the controller 11 to fluctuate.

That is, when employing a multiple of ground lines, installation is possible by the ground lines being disposed neighboring each other so that the heretofore described impedance relationship is established. That is, ground lines neighboring so that impedance is restricted to a minimum can be seen as being connected in one place. Heretofore, a description has been given of a multiple of lines extending from the ground line 12b, but the same applies when extending from the common ground line 12c, and furthermore, the ground lines 12a, 12b, and 12c are such that impedance can be reduced by using a copper bus bar, a printed substrate, or a ceramic substrate.

As heretofore described, by including at least the two batteries 3a and 3b, the drive units 10a and 10b to which power is supplied via the power supply system connector terminals of the batteries 3a and 3b and which drive the external actuators 2a and 2b respectively, and the controller 11 that controls by outputting control signals to the drive units 10a and 10b, and configuring so that a ground line of the controller 11 is shared in one place, a circulatory current path passing through the inside of the controller 11 can be eliminated, as a result of which a problem such as, for example, worsening analog voltage detection accuracy can be avoided.

Also, in the case of a configuration such that has two or more CPUs in the controller 11, and an exchange of data is carried out by communication between the CPUs and reflected in a control signal, data input errors can be restricted, and a worsening of failure determination and control signal accuracy can be restricted. This electronic control device is also applicable as two or more pairs of power supply system connector terminals, two or more pairs of drive units, and one or more pair of controllers, and is applicable even when, for example, there is a difference between voltages of the multiple of batteries 3a and 3b.

Second Embodiment

Figure 2:
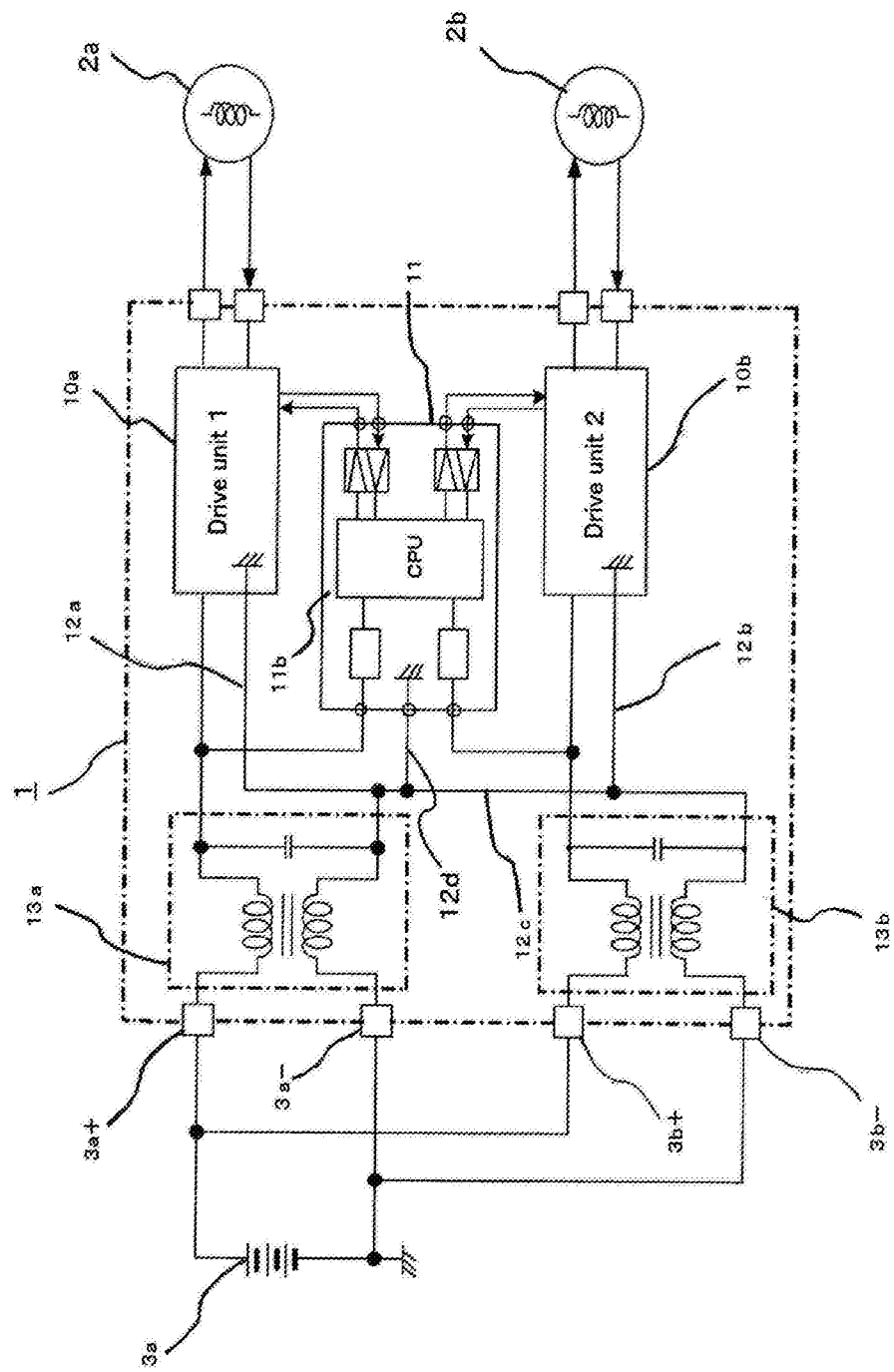
FIG. 2 is an overall circuit diagram showing an electronic control device according to a second embodiment of the invention.

FIG. 2 shows an overall circuit diagram of an electronic control device according to a second embodiment of the invention.

In the first embodiment, an electronic control device wherein the two batteries 3a and 3b are provided in parallel is described, but in the second embodiment shown in FIG. 2, a configuration is such that there is only the one battery 3a forming a power supply, two systems of power supply line are formed by the two pairs of connector terminals 3a+, 3a−, 3b+, and 3b− being connected to the battery 3a, and each power supply line supplies power to the control unit 1. Herein, filter units 13a and 13b are inserted immediately after the connector terminals 3a+, 3a−, 3b+, and 3b− in order to restrict noise in the control unit 1. Also, ground sides of these kinds of filter units 13a and 13b are commonly connected by the ground line 12c, and ground lines of the two are directly connected.

Also, the ground line 12d of the controller 11 is connected in one place from the common ground line 12c. The CPU 11b is configured of only one CPU, and configured so that independent input/output signals are supplied to each of the drive units 10a and 10b.

As other configurations are equivalent to those in FIG. 1, the same reference signs are allotted to equivalent portions, and a description will be omitted.

When the filter units 13a and 13b are provided in a vicinity of the power supply system connector terminals 3a+, 3a−, 3b+, and 3b−, as heretofore described, the common ground line 12c is desirably connected in a vicinity of exiting the filter units 13a and 13b, and by configuring in this way, noise generated in the controller 11 can be restricted by the filter units 13a and 13b, and the ground potential level of the controller 11 can be stably maintained as heretofore described, without worsening EMC (electromagnetic compatibility) characteristics of the electronic control device.

Third Embodiment

Figure 3:
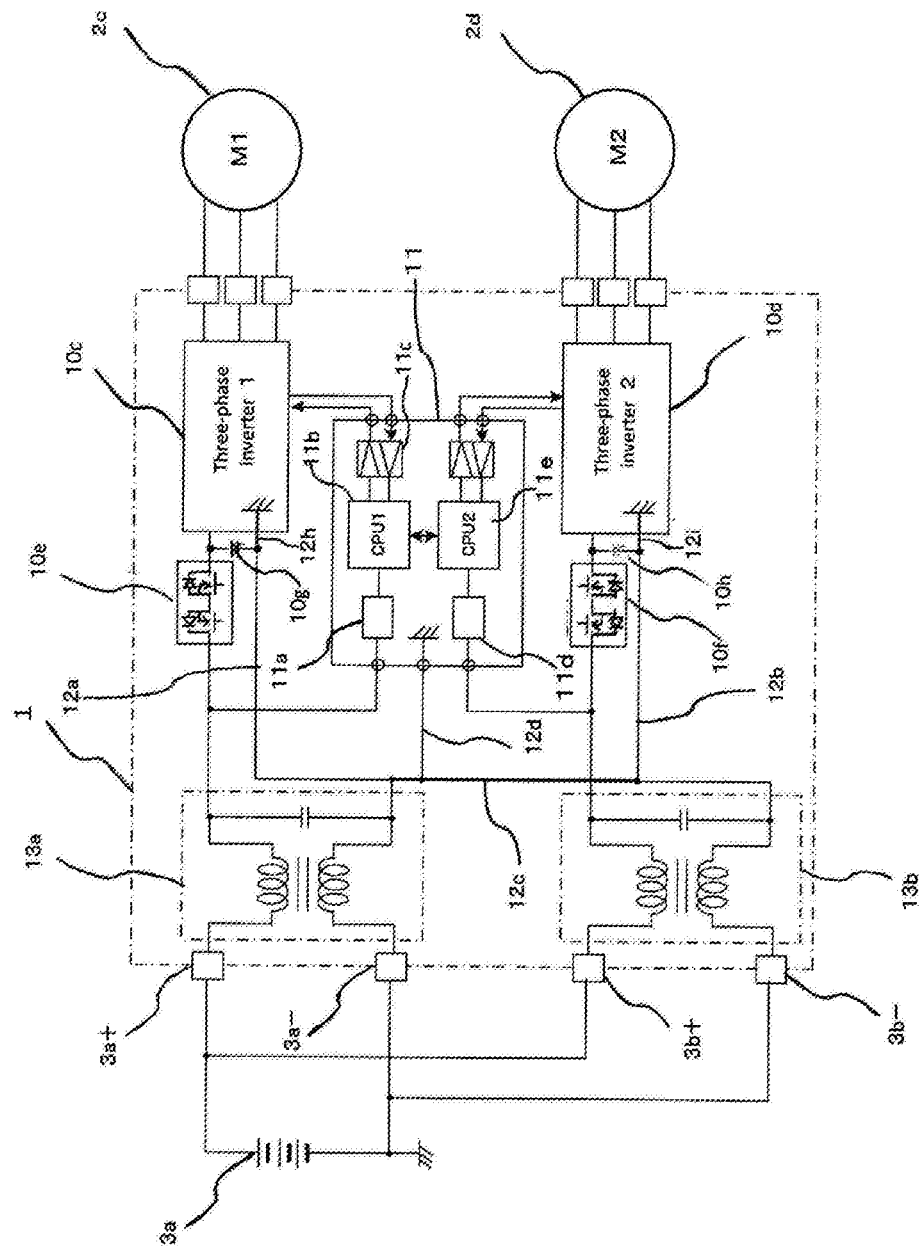
FIG. 3 is an overall circuit diagram showing an electronic control device according to a third embodiment of the invention.

FIG. 3 shows an overall circuit diagram of an electronic control device according to a third embodiment of the invention.

Figure 4:
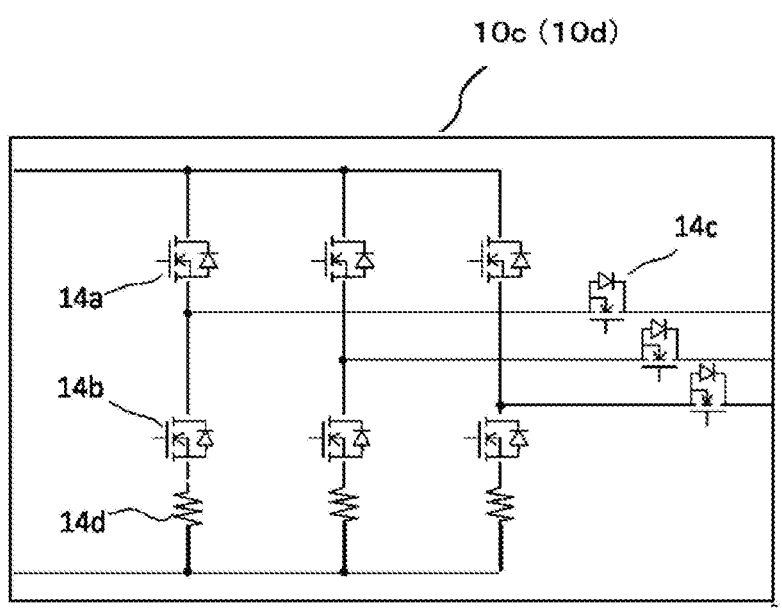
FIG. 4 is a circuit diagram showing a main configuration of the electronic control device according to the third embodiment of the invention.

In FIG. 3, the electronic control device is configured so that two systems of power supply line are formed by the connector terminals 3a+, 3a−, 3b+, and 3b− being connected to the one battery 3a, and power thereof is supplied to the control unit 1. Also, two three-phase inverters 10c and 10d are provided in the control unit 1 of the electronic control device, and power steering motors 2c and 2d corresponding to actuators are independently connected to the two three-phase inverters 10c and 10d. Furthermore, power supply relays 10e and 10f and smoothing electrolytic capacitors 10g and 10h are provided in a stage before the three-phase inverters 10c and 10d in the control unit 1. Also, as shown in FIG. 4, the three-phase inverters 10c and 10d are configured of switching elements, those being arm FETs (field effect transistors) 14a and 14b and a motor relay FET 14c, and a current detecting resistor 14d, and carry out feedback control by detecting voltage generated when current flows into the motors 2c and 2d.

As other basic configurations are the same as in FIG. 1 and FIG. 2, the same reference signs are allotted to equivalent portions, and a description will be omitted.

Based on this kind of configuration, a large current of 50 A or more flows into the motors 2c and 2d, current flowing into drive units thereof (the three-phase inverters 10c and 10d) is considerably large compared to current flowing into the controller 11, and depending on a ground line routing, there is a possibility of a path along which current is diverted into the controller 11 being formed. Because of this, a ground line connection configuration is extremely important.

That is, in the third embodiment, in the same way as in the second embodiment, the ground line 12d of the controller 11 is connected by the common ground line 12c downstream of the filter units 13a and 13b, whereby the ground potential level of the controller 11 is fixed, and the ground potential of the controller 11 can be stabilized. When connecting the ground line of the controller 11 from the ground line 12a or 12b connected to the three-phase inverter 10c or 10d, the controller ground is desirably connected from a place as near as possible to the filter units 13a and 13b, rather than being connected from an inverter ground line 12h or 12i, in which current fluctuation is large.

In the heretofore described embodiments, a description has been given of a case in which two actuators are driven by one or two batteries, but there may be three or more batteries, and the number of actuators is not limited to two.

Also, one portion or all of the embodiments can be freely combined, and each embodiment can be modified or abbreviated as appropriate, without departing from the scope of the invention.

REFERENCE SIGNS LIST

1: Control unit, 2a, 2b: Actuator, 2c, 2d: Motor, 3a, 3b: Battery, 3a+, 3a−, 3b+, 3b−: Connector terminal, 3c: Body line, 10a, 10b: Drive unit, 11: Controller, 11a, 11d: Power supply circuit, 11b, 11e: CPU, 11c, 11f: Input/output circuit, 12a, 12b: Ground line, 12c: Common ground line, 12d, 12e, 12f, 12g: Controller ground line, 13a, 13b: Filter unit, 10c, 10d: Three-phase inverter, 10e, 10f: Power supply relay, 10g, 10h: Electrolytic capacitor, 14a, 14b: Arm FET, 14c: Motor relay FET, 14d: Current detecting resistor, 12h, 12i: Inverter ground line

The invention claimed is:

1. An electronic control device, comprising:
a power supply in which a multiple of power supply system lines are provided;
a multiple of drive units to which the power is independently supplied from the power supply system lines; and
at least one controller that outputs control signals to the multiple of drive units, wherein
the electronic control device is configured so that negative side lines of the power supply system lines are connected by one ground line in the controller.

2. The electronic control device according to claim 1, wherein the negative side lines of the power supply system lines of the controller are connected directly by a common ground line without passing through the drive units, and are connected to the controller by one line from the common ground line.

3. The electronic control device according to claim 2, wherein the ground line of the power supply system lines of the controller is configured of a multiple of ground lines.

4. The electronic control device according to claim 3, wherein a disposition is such that a sum of impedances of ground lines connecting both an inside of the controller and a ground line common to the controller is greater than impedance between neighboring points on the common ground line.

5. The electronic control device according to claim 4, wherein the common ground line, a ground line connected to the drive units, or both thereof, are configured of a copper bus bar, a printed substrate, or a ceramic substrate.

6. The electronic control device according to claim 2, wherein the common ground line, a ground line connected to the drive units, or both thereof, are configured of a copper bus bar, a printed substrate, or a ceramic substrate.

7. The electronic control device according to claim 2, having filter units to which the power supply system lines are connected, wherein a common ground line that directly connects ground lines of the two filter units is provided directly after passing through the filter units.

8. The electronic control device according to claim 1, wherein the negative side lines of the power supply system lines are connected to the controller by one ground line extended from a negative side terminal of a power supply connector.

9. The electronic control device according to claim 8, wherein the ground line of the power supply system lines of the controller is configured of a multiple of ground lines.

10. The electronic control device according to claim 9, wherein a disposition is such that a sum of impedances of ground lines connecting both an inside of the controller and a ground line common to the controller is greater than impedance between neighboring points on the common ground line.

11. The electronic control device according to claim 10, wherein the common ground line, a ground line connected to the drive units, or both thereof, are configured of a copper bus bar, a printed substrate, or a ceramic substrate.

12. The electronic control device according to claim 8, having filter units to which the power supply system lines are connected, wherein a common ground line that directly connects ground lines of the two filter units is provided directly after passing through the filter units.

13. The electronic control device according to claim 1, wherein the negative side lines of the power supply system lines of the controller are connected by one ground line extended from a ground line connected to one of the drive units.

14. The electronic control device according to claim 13, wherein the ground line of the power supply system lines of the controller is configured of a multiple of ground lines.

15. The electronic control device according to claim 14, wherein a disposition is such that a sum of impedances of ground lines connecting both an inside of the controller and a ground line common to the controller is greater than impedance between neighboring points on the common ground line.

16. The electronic control device according to claim 15, wherein the common ground line, a ground line connected to the drive units, or both thereof, are configured of a copper bus bar, a printed substrate, or a ceramic substrate.

17. The electronic control device according to claim 13, having filter units to which the power supply system lines are connected, wherein a common ground line that directly connects ground lines of the two filter units is provided directly after passing through the filter units.

18. The electronic control device according to claim 1, having filter units to which the power supply system lines are connected, wherein a common ground line that directly connects ground lines of the two filter units is provided directly after passing through the filter units.

* * * * *